United States Patent [19]

Anders et al.

[11] 4,016,478

[45] Apr. 5, 1977

[54] HIGH-VOLTAGE TRANSFORMER

[75] Inventors: Herbert Anders; Antonius Adrianus Maria Bullens; Jan Groot; Johannes Henricus Bernardus Otten; Hendrikus Christiaan Josephus Stoof; Carolus Leopoldus Vloemans, all of Eindhoven, Netherlands

[73] Assignee: U.S. Philips Corporation, New York, N.Y.

[22] Filed: Sept. 4, 1975

[21] Appl. No.: 610,447

[30] Foreign Application Priority Data

Sept. 5, 1974 Netherlands ...................... 7411772

[52] U.S. Cl. ............................... 321/27 R; 321/46; 336/107

[51] Int. Cl.[2] .................... H02M 7/10; H01F 27/04

[58] Field of Search .................. 321/2, 8 R, 47, 46, 321/27 R; 174/52 PE; 178/DIG. 11; 315/410, 411; 336/107

[56] References Cited

UNITED STATES PATENTS

| | | | |
|---|---|---|---|
| 3,886,434 | 5/1975 | Schreiner | 315/411 |
| 3,904,928 | 9/1975 | Sawada et al. | 321/2 |
| 3,947,749 | 3/1976 | Kimura et al. | 178/DIG. 11 |

*Primary Examiner*—William H. Beha, Jr.
*Attorney, Agent, or Firm*—Frank R. Trifari; Henry I. Steckler

[57] ABSTRACT

A component holder is arranged on the windings of a diode-split line transformer. On this holder the diodes, the focus bleeder and the high-voltage bleeder can be arranged. The connection strips of the components act as soldering pins for the winding ends. The high voltage is connected via a socket connector which is clamped to the component holder by way of two snap tags. The socket connector is provided with radially extending ribs so as to increase the creepage path. The contact spring of the socket connector has a triangular shape, thus ensuring a large contact surface area.

5 Claims, 4 Drawing Figures

HIGH-VOLTAGE TRANSFORMER

The invention relates to a high-voltage transformer, notably a line transformer for a television receiver, comprising a ferromagnetic core, a primary winding, an insulating layer, a secondary winding, a component holder, and a socket connector for the output of the high voltage to be generated, the secondary winding consisting of a number of winding layers wherebetween insulating layers are inserted, a transition from an end of a winding layer to a beginning of the subsequent winding layer being formed by a diode, all diodes constituting the transitions between the further winding layers being connected in the same rectifying sense. A transformer of this kind is known from British Patent Specification 1,090,995. The component holder of the transformer at the same time acts as the coil holder. On the component holder connection pins are provided whereto the windings of the coils and the diodes can be separately soldered. Consequently, for one diode winding connection two welds are required. Moreover, in this coil holder the position of the windings and the diodes with respect to each other is not fixed, which necessitates, for reasons of safety, a spacing between the diodes themselves and also between the windings and the diodes which is larger than would be required in the case of an ideal situation of the components. As a result, a compact construction is not possible. The high voltage to be generated is output via a high-voltage cable which is soldered either to a terminal rail or to a connection pin on the coil holder. As a result, the high-voltage transformer is no longer a universal circuit component, because it is sometimes desirable to use other types of high-voltage cable, or a cable of the same type but a different length.

The invention has for its object to eliminate the described drawbacks and to provide a high-voltage transformer which has a compact construction which is also more universal.

To this end, the invention is characterized in that the component holder is arranged on the secondary windings, on the component holder supports being formed whereon diodes are clamped such that they cannot rotate about their axis, the connection wires of the diodes serving as connection pins for a part of the windings, the socket connector being clamped by way of two tags formed on the component holder.

It is advantageous to mount bleeder resistors, such as the focus bleeder resistor and the high-voltage bleeder resistor, also on the component holder. The focus and the high-voltage bleeder resistors provide additional loading of the high-voltage transformer, thus causing a reduction of the internal resistance of the high-voltage supply. As a result, the focus voltage and the high voltage are more current-independent. The mounting of the bleeder resistors on the coil holder saves space elsewhere, whilst the dimensions of the high-voltage transformer are only slightly increased. At the same time, connections to bleeder resistors outside the high-voltage transformer are avoided, so that a safer operation of the high-voltage section of the television receiver is achieved.

The invention will be described in detail hereinafter with reference to a drawing showing an embodiment of a high-voltage transformer according to the invention.

Figure 1:
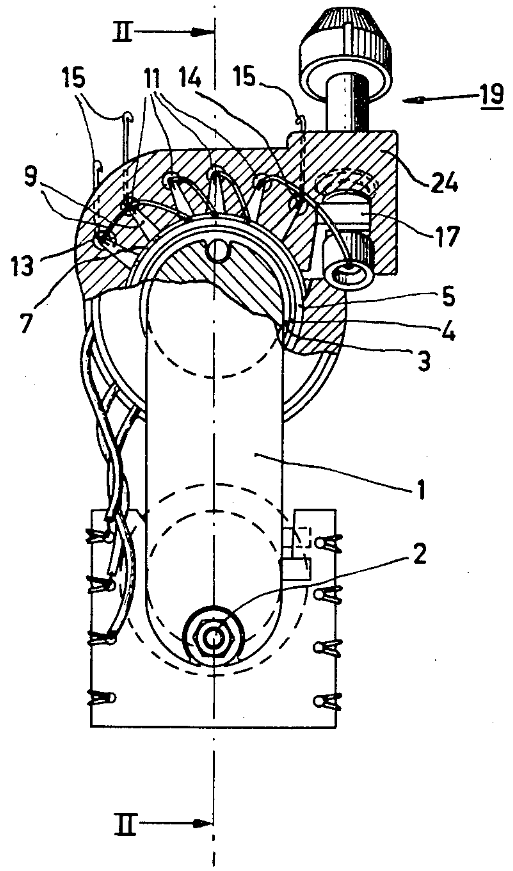
FIG. 1 shows a partly broken away front view.

The high-voltage transformer illustrated in FIG. 1 comprises a core 1 consisting of two parts which are clamped together by means of bolts and nuts 2 (only partly shown). On one leg of the core there are provided a primary winding 3 and a secondary winding 5 which are separated by an insulating layer 4. A component holder 7 is arranged on the winding 5. The component holder 7 is provided with supports 9, which are shaped such that the diodes 11 and the bleeder resistors 13 and 14 clamped therein cannot rotate about their axis. Very good positioning and unambiguous spacing are thus obtained. The welded joint between a winding and the connection wire of a diode and/or of a bleeder resistor should be rounded, because otherwise undesired effects can occur when a high-voltage is generated. The necessary connection pins 15 of the diode 11 and the bleeder resistors 13, 14 project from the moulding compound 24 cast about the high-voltage section of the transformer. The component holder 7 is provided with tags 17 wherebetween a socket connector 19 is secured. The generated high voltage is connected via a socket connector 19.

Figure 2:
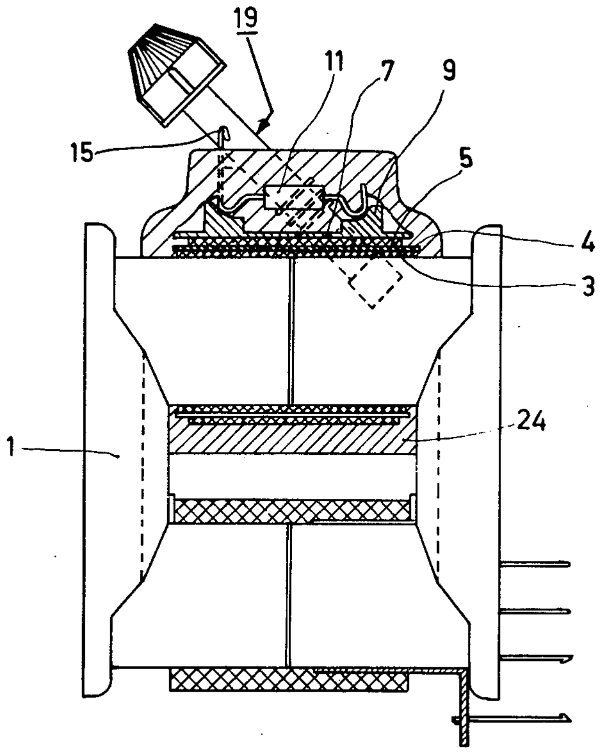
FIG. 2 is a sectional view taken along the line II—II in FIG. 1.
Figure 3:
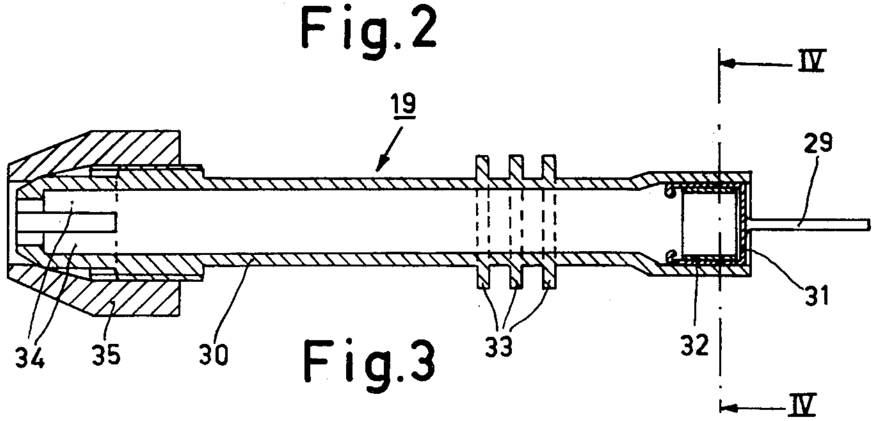
FIG. 3 is a longitudinal sectional view of an embodiment of a socket connector.

So as to obtain a better idea of the construction of a high-voltage transformer, a sectional view taken along the lines II—II of FIG. 1 is shown in FIG. 2. The principal components are denoted by references corresponding to those of FIG. 1. It will be obvious that the primary winding 3 can alternatively be partly or completely wound about the other leg of the core. If the primary winding is distributed between the two legs of the core, the part of the primary winding situated underneath the secondary winding is usually referred to as coupling winding. FIG. 3 is a sectional view of the socket connector 19. The Figure shows a pipe 30 wherein a socket 31 is clamped on the one end, the said socket containing a triangular spring 32 for making firm contact with a pin connector (not shown) to be inserted into the socket connector 19.

The high voltage to be generated is connected to the socket 31 via a conductor 29.

Ridges 33 are provided on the pipe 30 so as to increase the creepage path.

For clamping the plug connector to be inserted, the pipe is provided on its other end with tapered claws 34. The claws 34 are pressed towards each other by tightening a coupling nut 35.

Figure 4:
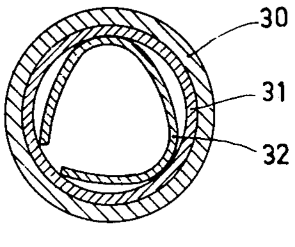
FIG. 4 is a cross-sectional view of the socket connector shown in FIG. 3, taken along the line IV—IV.

FIG. 4 shows a sectional view through one end of the pipe 30, taken along the line IV—IV in FIG. 3. It is to be noted that the output of a high-voltage via a socket connector in combination with a plug connector is known from German Offenlegungsschrift No. 2,052,922. Therein, electrical connection is effected by way of a contact spring having a fork-like shape. The electrical connection between the contact spring and a pin to be contacted thereby consists of only a few contact points.

The embodiment according to the invention is shaped as a triangular spring which offers a larger contact surface area.

What is claimed is:

1. A high-voltage transformer comprising a ferromagnetic core, a primary winding disposed on said core, an insulating layer disposed on said winding, a secondary winding disposed on said layer, a component holder, a socket connector mounted on said holder for the output of the high-voltage to be generated, the secondary winding including a number of winding layers, insulating layers disposed between said layers, a plurality of diodes coupled between an end of the winding layer to a beginning of the subsequent winding layer respectively, all diodes being coupled in the same rectifying sense, the component holder being disposed on the secondary windings, support means being disposed on the component holders for clamping the diodes to prevent rotation about their axis, the connection wires of the diodes comprising connection pins for a part of the windings, and two tag means disposed on the component holder for clamping the connector.

2. A high-voltage transformer as claimed in claim 1, wherein a resistor is clamped on the supports of the component holder.

3. A high-voltage transformer as claimed in claim 1, wherein the socket connector comprises a triangular spring means for the electrical contacting of a pin connector of a high-voltage cable to be connected.

4. A high-voltage transformer as claimed in claim 1, wherein the socket connector can be rotated with respect to the component holder.

5. A television line transformer comprising a high voltage transformer as claimed in claim 1.

* * * * *